INVENTOR
David E. Hervey

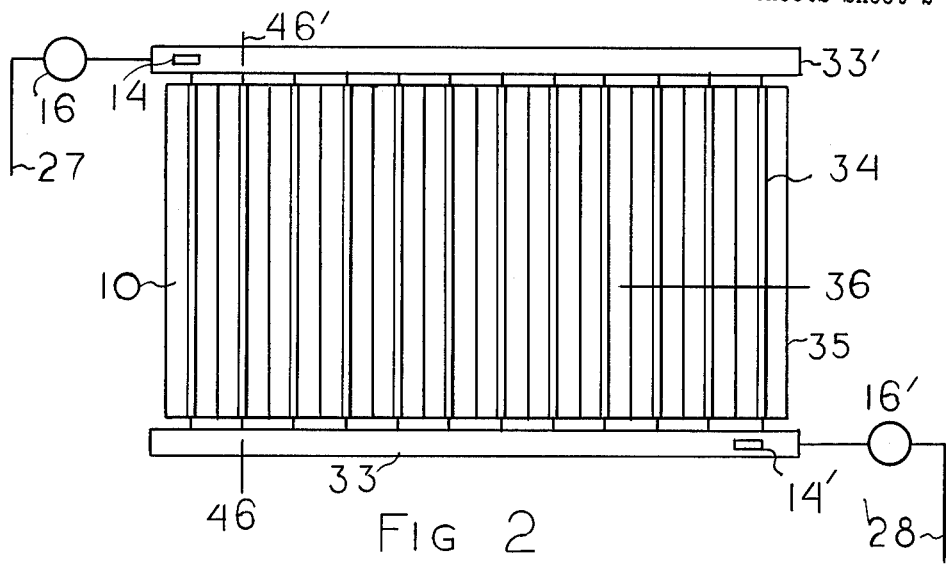
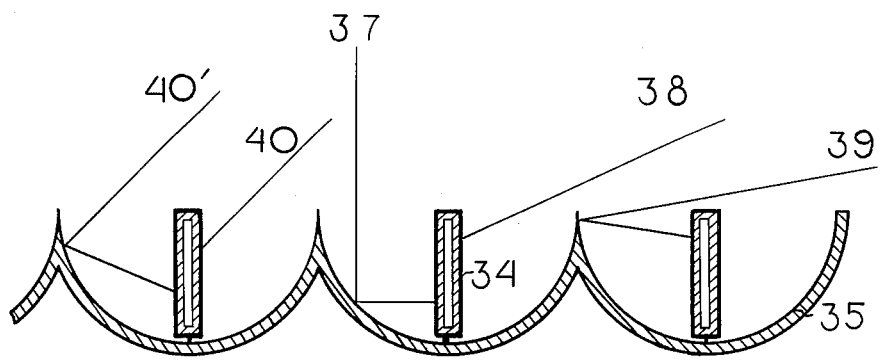

July 26, 1966 D. E. HERVEY 3,262,493
MEANS FOR HEATING AND COOLING A STRUCTURE
Filed May 20, 1963 4 Sheets-Sheet 3

INVENTOR
David E. Hervey

July 26, 1966   D. E. HERVEY   3,262,493
MEANS FOR HEATING AND COOLING A STRUCTURE
Filed May 20, 1963   4 Sheets-Sheet 4

INVENTOR
David E. Hervey

United States Patent Office 3,262,493
Patented July 26, 1966

3,262,493
MEANS FOR HEATING AND COOLING A STRUCTURE
David E. Hervey, Logansport, Ind., assignor to Industrial Institution International, Ltd., Elm City, N.C.
Filed May 20, 1963, Ser. No. 281,629
2 Claims. (Cl. 165—50)

This invention relates to heating and cooling a structure by using climatic heat and cold.

More particularly this invention relates to heating and cooling a structure by the use of natural heat and cold ambient to the structure without the use of mechanical, chemical, or other means of increasing said heat or cold for such purposes.

A preferred embodiment of this invention incorporates the improved collection and storage of heat and cold each in one season for use in the opposite season, said storage being in large blocks of undisturbed earth.

Said preferred embodiment also incorporates in certain desired applications the use of a single large block of undisturbed earth for both the storage of cold in the winter time for use in the summer following and for storage of heat that summer for use the next winter.

Also, this invention incorporates a dual purpose method and means of heat removal from a structure for both the cooling of said structure and the storing of said heat for later use in warming the structure. Conversely, this invention incorporates the removal of cold from a structure for the dual purpose of warming said structure and storing said cold in the one process and for later use of said cold for cooling said structure.

In some cases the most efficient application of this invention incorporates the graduated zoning of said heat and cold storage areas with less intensity out from the center of a storage area, so that heat and cold of multiple intensities may be received and stored as available and also to reduce perimeter losses of heat or cold of the storage block.

This invention also incorporates the use of ambient temperatures of soil surrounding a structure to semi heat and cool the exterior walls of a structure to reduce the heating and cooling load of the interior portions of that structure.

This invention also incorporates the provision of an improved system of collecting solar heat and of a basically new concept of storing this heat deep within a large block of undisturbed earth in an extremely efficient and economical manner and one requiring only negligible maintenance and operating costs and astonishingly low installation costs.

As with the heat storage facilities in this invention all prior solar heat collectors and transfer elements are completely inadequate to accomplish what has been accomplished by my present invention by actual construction and use over two entire winter heating periods and summer storage periods.

Heretofore solar heat receptors have either comprised merely flat surface receptors, simple round pipe direct solar ray receptors, or with flat back reflectors, or where curved or semicylindrical reflectors were used the focal plane was disregarded and the small round heat reception tubes received only a small portion of the rays falling on the collector. In addition, my collector serves the dual purpose of collecting cold at night in the winter and transferring it to a cold storing block of earth while simultaneously heating the roof surface of the structure and thereby reducing its heat load.

The structure element in my present invention is without precedence in several ways. Natural heat and natural cold are collected and stored in the ground as such and are brought back to the structure to make it comfortable year round. This is augmented by current climatic heat and cold collection, so that no auxiliary house heating or cooling systems are needed even in relatively severe climates.

Various temperatures of both heat and cold may be stored and then used or used directly in various parts of the structure so as to both utilize lower temperatures of heat and higher temperatures of cold and to conserve the stored heats of higher temperatures and the stored colds of lower temperature.

Thus, the house heating and cooling loads are greatly reduced by using low heat and low cold temperature values in hollow exterior wall zones—said low heat and cold values would otherwise be lost.

Also, each element of the structure heating and cooling system may be used either for collecting heat or collecting cold to be transferred and stored as well as for structure conditioning elements and, in fact with this invention may be performing both functions at the same time.

Thus the colder the winter the better for conditioning the house the next summer and vice versa. Not only is this true, but the act of storing cold warms the structure and the act of storing heat cools the structure, both when needed most. There is no precedent for this system of "having your cake and eating it too."

This invention, therefore, accomplishes the complete task of furnishing all the heat and cold required to heat and cool a structure such as a house year round by employing four basic elements and four only. Namely, One—natural heat and cold collection by adequate means. Two—storing this heat and cold by adequate means. Three—utilizing this heat and cold within a structure by adequate means; and Four—by utilizing adequate fluid transfer elements to transfer adequately the heat and cold as the case may be when it is in excess, to the storage, or as needed to supply the structure.

It is an object, therefore, of this invention, to collect, store, and use natural heat and cold to condition a structure.

Another object of this invention is to provide a threefold structure conditioning system comprising an improved solar collector, improved and adequate ground storage, and improved structure conditioning means.

A further object of this invention is to provide an improved solar collector which receives every ray of solar energy falling on its area into its heat receptor-transfer tubes.

Another object of the invention is the provision of a solar collector having flattened fluid heat transfer tubes for improved heat reception in cooperation with semicylindrical heat reflectors.

Still another object of this invention is the provision of method and means for semi heating and cooling exterior walls of a structure by using natural heat and cold of low intensity ambient or near a structure to reduce the interior heating and cooling load of the structure.

Another object of this invention is to provide a very inexpensive system for large scale storage of heat and cold in undisturbed earth and also the removal and use thereof when needed.

Another object of this invention is to provide multiple zoned earth heat and cold storage blocks for storing various intensities or temperatures of heat or cold.

Still another object of this invention is to provide concentric zones of storage of heat and cold to reduce perimeter losses of heat and cold from that storage by conduction.

A further object of this invention is to collect, store and use natural heat and cold by the combined processes of radiation, conduction and convection to completely temperature condition a structure.

Further objects will be apparent from the specifications and drawings and the more detailed description and illustration of preferred embodiments contained herein must not be construed to limit the scope of the invention.

Referring to the drawings

FIG. 2 is a plan view of a collector element.

FIG. 3 is a cross section view of a part of FIG. 2.

The above mentioned drawings illustrate a typical domestic installation embodying the invention by way of example. Following is a more detailed description of same.

Figure 1:
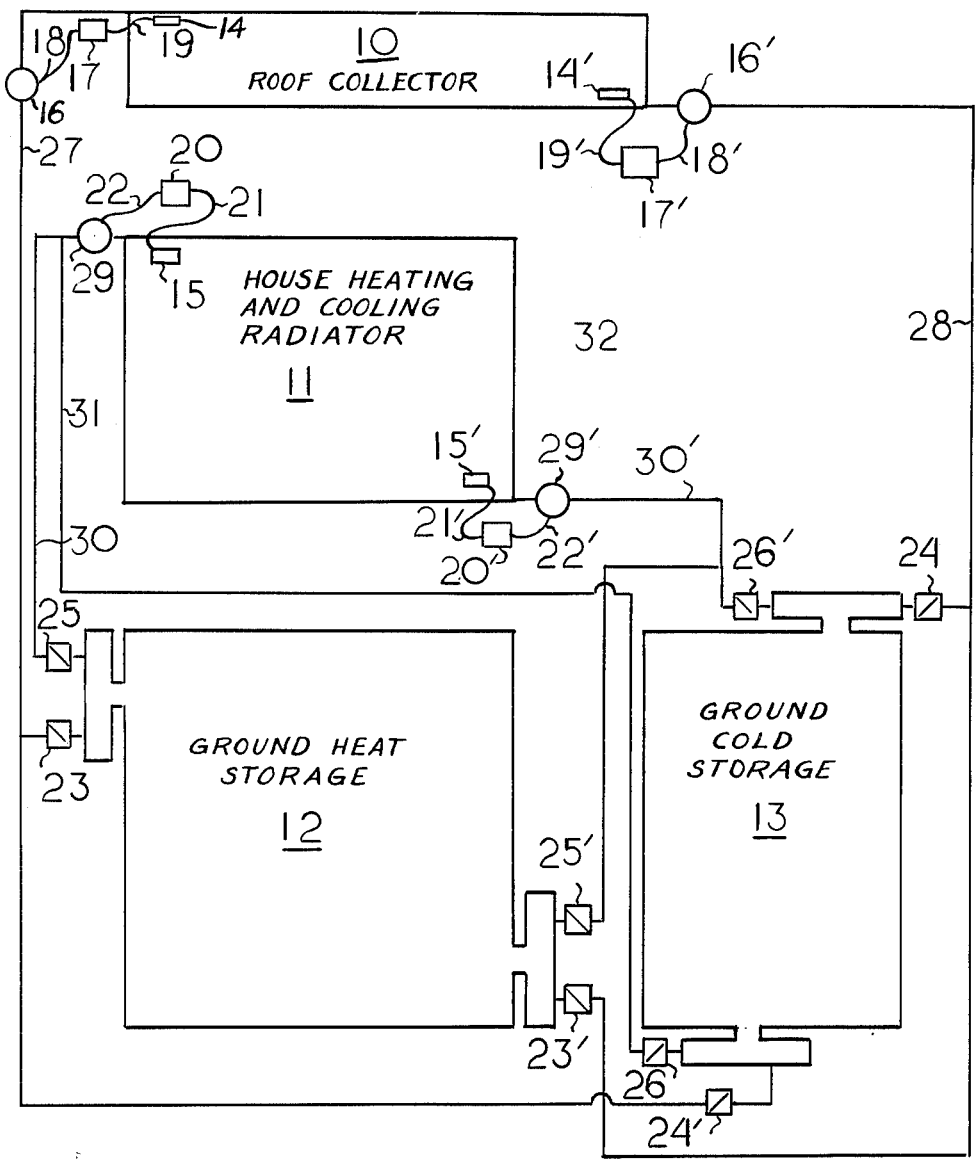
FIG. 1 is a schematic drawing of basic elements of the invention.

Referring to FIG. 1 of the drawings the various elements are shown as follows, the roof collector 10, house heating and cooling radiator 11, ground heat storage block 12, and ground cold storing block 13.

On a typical summer day when the fluid in solar collector 10 reaches a temperature of say 180° F. aquastat 14 with capillary 19 activates electric switch 17 which activates electric motor circulator 16 by way of electrical line 18 causing the hot fluid to pass from collector 10 out through pipe line 27 thence through check valve 23 into ground storage coil 12 and being a closed fluid system, this causes a counter flow of fluid of the temperature ambient coil 12 of say 70° F. to flow out through check valve 23' through line 28 and collector 10 to probe 14 said cooler 70° F. temperature then causing probe 14 to break the circuit from switch 17 by way of line 18 to circulator 16 and causing it to stop until solar heat again raises the temperature of the fluid in collector 10 to the preset temperature of say the 180° F. at which time the foregoing process is repeated. By this process fluid of higher heat is transferred repeatedly from collector 10 to ground heat storage coil 12 and the heat thereof flows by conduction into the earth block ambient coil 12.

Likewise, in the wintertime at night when the temperature of the fluid in roof collector 10 drops to a preset point say 35° F., aquastat 14' by means of capillary 19' activates switch 17' which makes on the fall to activate motor circulator 16' by way of electric line 18' which causes flow out of collector 10 by means of line 28 through check valve 24 into cold storage coil 13 causing thereby counterflow from coil 13 through check valve 24' and line 27 into collector 10 of fluid from cold storage coil 13 of say 45° F. until it reaches aquastat 14' causing its temperature to rise thereby opening switch 17' by means of capillary 19' and stopping electric motor circulator 16'.

When the structure 32 needs to be heated by structure radiator 11, as sensed by thermo probe 15 which may be inside or outside radiator 11, switch 20 activated by capillary 21 conducts electricity via line 22 to motor fluid circulator 29 causing fluid in radiator 11 to flow through line 30 and check valve 25 into ground storage coil 12 and being a closed circuit this causes heated fluid in coil 12 by counter flow action to flow through check valve 25' and line 30' into house heating radiator 11 thus heating it and heating the structure. By repeated exchanges of fluid in radiator 11 (which has dissipated its heat to the structure 32) with the fluid in heat storage coil 12 which has absorbed heat from the ground storage block of earth surrounding coil 12 the structure is heated.

When the structure 32 needs to be cooled a similar exchange takes place between house radiator coil 11 and cold storage coil 13 activated by thermo probe 15', capillary 21', switch 20', line 22' and motor fluid circulator 29' through line 30' check valve 26' into coil 13 with counter flow of the cold fluid in coil 13 passing through check valve 26 and line 31 into house coil 11. The cold fluid in coil 11 then absorbs heat from the structure because of the differential of temperature between the two and when it becomes sufficiently warm thermo probe 15' again activates a similar exchange of fluids between coil 11 and coil 13 so that the warmed fluid is transferred to coil 13 where the heat in said fluid is absorbed by the cold block of earth ambient coil 13, slowly but gradually warming said earth ambient coil 13.

The following winter at night when the fluid in the roof collector 10 reaches a predetermined low temperature below that of coil 13 and the surrounding earth, said coil 13 is again cooled by the fluid from collector 10 as previously described but in doing so the heat stored in earth block ambient coil 13 from the summer cooling operations of the structure 32 and stored in earth block ambient coil 13 now is sent to the roof collector coil 10 to be dissipated, but in so doing the roof of the structure 32 containing roof collector coil 10 is heated to say 40° F. thereby reducing the heating load of the structure 32 by this semi heating of its exterior surface. This reduction of heat loss from a house for instance may be very substantial, especially in a severe climate or on very cold days and nights since the temperature differential from inside to outside the structure 32 may be as from 70° F. to 40° F. instead of from 70° F. to say 10 below zero F. Thus as far as the roof is concerned it is as though the structure was built in a semi tropical region. Power is furnished to electric switches 17 and 17', and 20 and 20' by regular house electric circuits not shown.

In order to achieve an object of the invention i.e. to heat and cool a structure year round without auxiliary means, highly efficient elements and methods for heat and cold collection, storage, and use are required. FIGURES 2 and 3 show the structure of a preferred type of heat and cold collector. In FIG. 2 fluid circulators 16 and 16', sensing probes 14 and 14' and flow lines 27 and 28 may be the same as in FIG. 1. The electrical elements of FIG. 1 are not shown to avoid too much duplication. In FIG. 2 fluid transfer from heat storage coil 12 (FIG. 1) and cold storage coil 13 (FIG. 1) enter roof collector coil 10 by way of pipe line 28 and leave by way of pipe line 27 as previously described in the functioning of the system FIG. 1. Parts of collector 10, a preferred embodiment of same, are shown in more detail to more adequately describe the exact functioning of collector 10. When relatively cool fluid say 70° F. from heat storage ground coil 12 enters collector 10 it does so by entering manifold 33 thence passes through manifold tubes 34 (which transverse the vertical radius of semicylindrical heat reflectors 35 bisecting same) until said fluid enters manifold 33', whence it leaves manifold 33' by way of pipe line 27.

On a day when solar heat is available, the solar rays impinge on tubes 34 directly or are reflected to same by semicylindrical reflectors 35 and the resultant heat received by the tubes 34 is transmitted by conduction to the fluid contained by them thus raising its temperature to a predetermined level of say 180° F. These tubes and also the manifolds are colored to a heat receptive color such as dark brown or soot black. The heat in the manifold 33' is also warmed by direct solar rays and while the tubes reach a temperature of 180° F., the manifold reaches a temperature of say 160° F. and when this situation obtains the aquastat temperature probe 14 activates fluid circulator 16 as previously described and moves the fluid from collector 10 to ground heat storage coil 12 (FIG. 1) with counter flow from storage coil 12 filling collector 10 with cool fluid.

This novel collector is so scientifically constructed that all of the solar rays falling on the face of said solar collector fall either directly onto said collector tubes 34 or are reflected to same by semicylindrical reflectors 35. Thus not only 100 percent of the sun's rays enter the fluid transfer tubes 34 of the collector 10, but the surface of said tubes 34 is reduced to about one half that of a flat collector by their being vertical in cross section and of their relative position within reflectors 35 so that virtually the entire surface receives heat. There are thus no moving parts needed to orient the collector to the incidence of the sun's rays. This results in almost double heat reception on the surface of collector tube 34 formerly obtained resulting in very high heat receptivity for collector 10.

This is more clearly shown in FIG. 3, vertical cross section of part of FIG. 2 taken on line 36 of FIG. 2 where 37, 38, 39, and 40 and 40′ represent solar radiant heat rays entering collector 10 and either entering tubes 34 directly or by reflection from reflectors 35.

Conversely, when at night in the winter the collector 10 is acting to collect cold instead of heat it does so by removing heat from cold storage block 13 FIG. 1 by means of fluid passing through pipe line 27 and filling collector tubes 34. Again referring to FIG. 3 tubes 34 are now the source of radiant energy and in addition to radiating directly into space as represented by rays 40 and 38 this heat is radiated into space by first being reflected by reflectors 35 as represented by rays 37, 39, and 40′. There is also heat exchange in both collection and dissipation by the usual processes of conduction and convection with the atmosphere.

Figure 4:
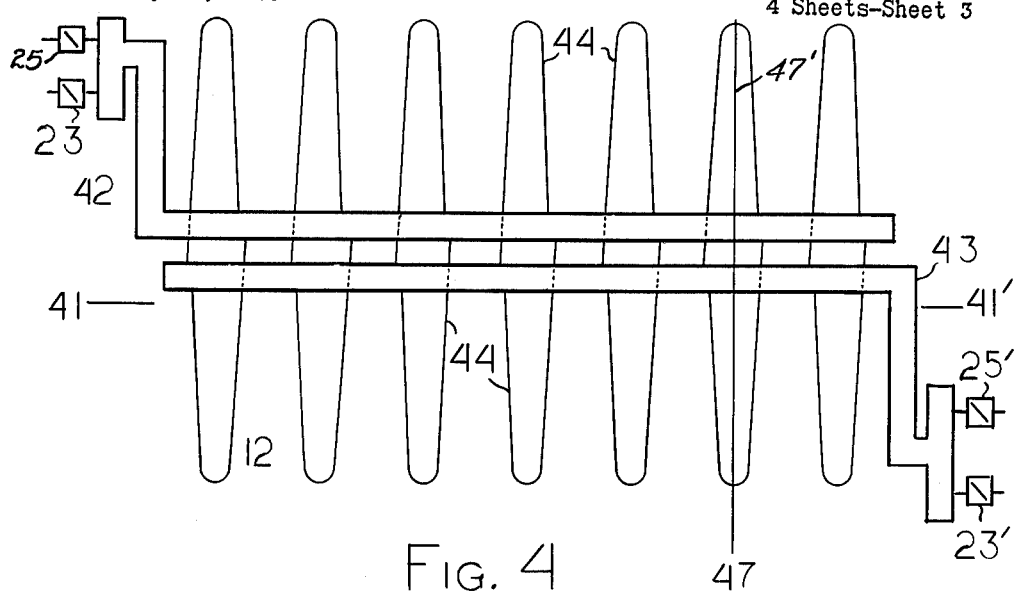
FIG. 4 is a plan view of a storage element.

Ground heat storage unit 12, FIG. 1 will now be more completely described in a preferred embodiment by describing plan view FIG. 4 wherein check valves 25 and 23 and 25′ and 23′ correspond to those of like numerals in FIG. 1. In the case of heat storage, hot fluid enters the coil 12 by way of check valve 25 from roof collector 10 and enters manifold 42 from whence it passes outwardly and downwardly through U exchange tubes 44 at spaced intervals in heat storage coil zone 12, from whence said fluid also rises through the latter half of said U returns 44 upwardly and inwardly to manifold 43 where it comes to rest and loses its heat to the earth, ambient coil 12. Heat storage coil zone 12 should be of sufficient size to heat the house for a full winter when subjected to to a full summer's heat, and under average conditions the area underneath a house and 30 feet deep from below the basement floor will suffice in average soil where there is a reasonable amount of solar heat collection in the winter on sunny days. In more extreme conditions and requirements a larger block and added features are necessary to completely heat the house. To insert said U returns 44 holes are first bored into the earth block 12.

Figure 5:
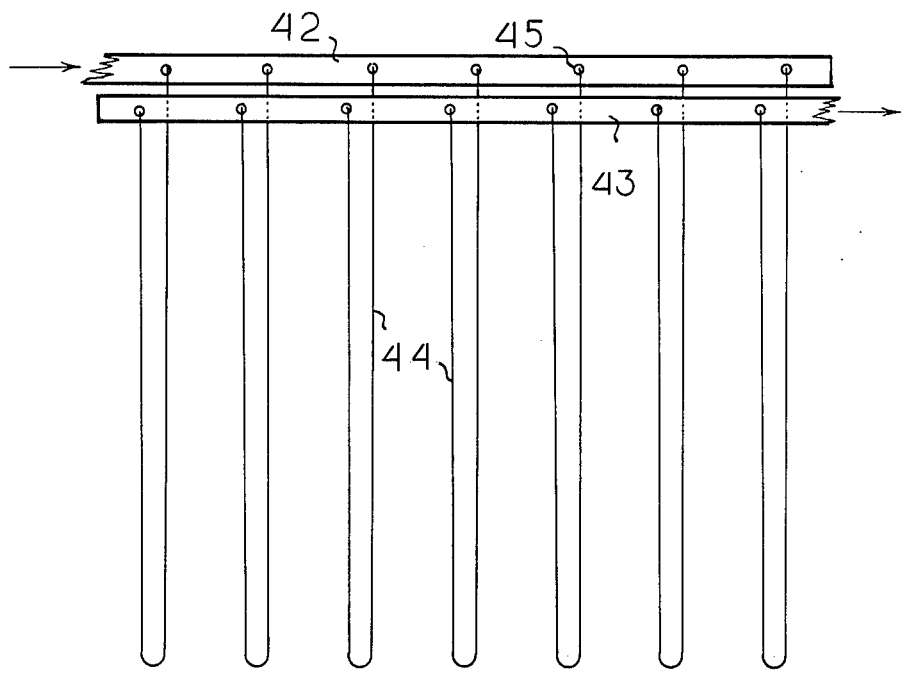
FIG. 5 is an elevation of a section of FIG. 4.

FIG. 5 is a longitudinal elevation taken on line 41–41′ of one row of U return tubes 44 in their corresponding relationship and connection to manifolds 42 and 43, FIG. 4, by way of orifices 45.

When heat is taken from heat storage coil zone 12 to heat the house by means of radiator coil 11, FIG. 1 cool fluid from coil 11 enters coil 12 by way of check valve 25, FIG. 4 and manifold 42, then passes through U returns 44 and into manifold 43 causing a counter flow of fluid in coil 12 (which has been warmed by contact with warm ambient earth) into the house radiator 11, FIG. 1 by way of check valve 25′ and line 30′ which in turn warms the structure.

In like manner cold fluid is taken from cold storage area 13, FIG. 1 which is the same or similar in structure and operation to FIG. 4, and delivered to house coil 11 in exchange relationship with fluid from coil 11, said cold fluid then cools said house structure 32 by absorbing heat from same through the processes of radiation from said structure 32 and convection air currents and conduction into radiator 11. This then heated fluid is then exchanged with fluid in said cold storage coil 13 where it comes to rest and deposits said heat in said cold storage area 13 ambient earth, in a repetitive process all summer depositing considerable quantities of heat in millions of B.t.u.'s. This heat is then transferred to roof collector 10 the following winter while cold is being stored in cold storage area 13, heating said roof and thereby partially heating said house.

Figure 6:
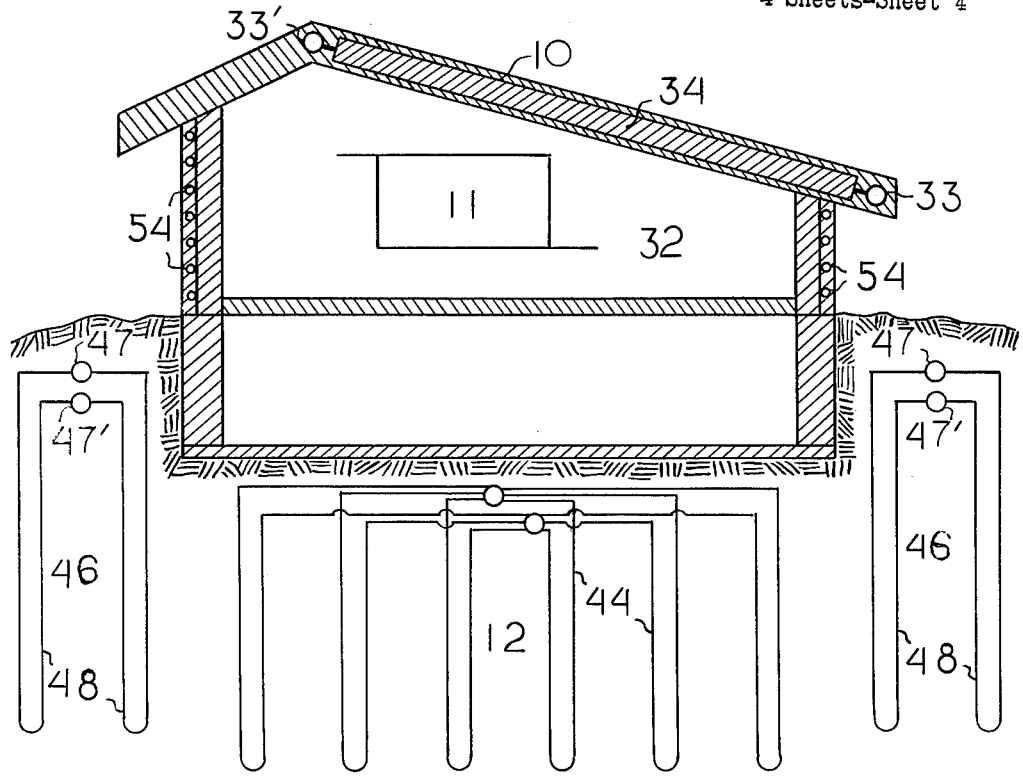
FIG. 6 is cross section of a house and cross sections of various basic elements of the invention.
Figure 7:
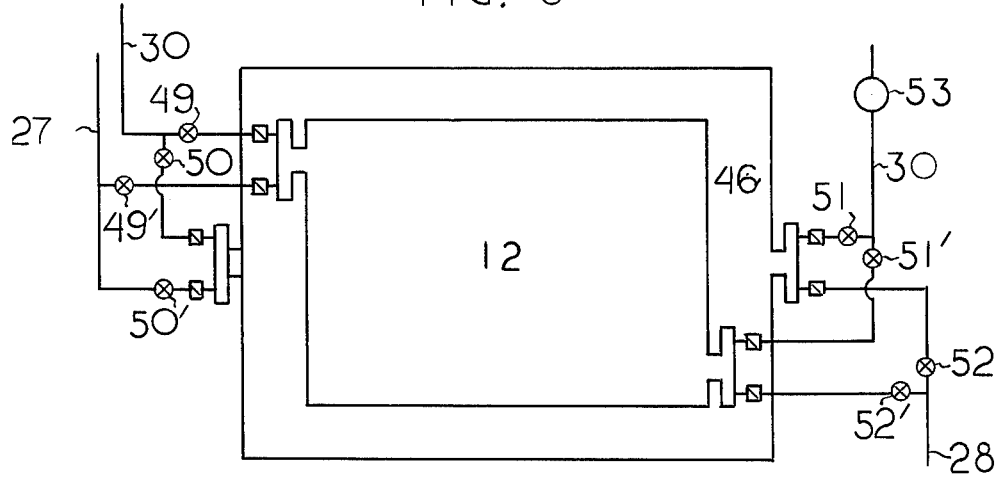
FIG. 7 is a schematic plan view of the hot central and warm perimeter ground storage areas as illustrated in FIG. 6.

FIGURE 6 is a diagrammatic cross section of a house showing the relationship of elements of the heating and cooling system as used in this illustrative embodiment of the invention. Roof collector 10 is shown in cross section on line 46–46′ of FIG. 2 and corresponding parts have like numbers. Subbasement hot storage coil zone 12, FIGS. 1 and 4, is shown in diagrammatical cross sectional elevation taken on line 47–47′, FIG. 4. House radiator coil or temperature conditioning coil 11, FIG. 1, is shown in living area of the house 32, connected relationship being shown in FIG. 1. In FIG. 6 and FIG. 7 is also shown perimeter warm and cool storage zone coil 46 with manifolds 47 and 47′ and U return coils 48. This warm and cool storage zone 46 is operated in conjunction with roof coil 10 in the same manner as the hot storage coil 12, but in this case coil 46 is substituted on occasion for hot coil 12 by manually operated valves as illustrated in FIG. 7. When solar energy available in collector 10 is not sufficient to make a profitable exchange with hot zone 12, then hand valve 49′ is closed and valve 50 is opened and warm storage zone 46 is automatically substituted for hot zone 12. Thermal probe 14 in roof collector 10 is adjusted downward to say 120° F., for example, to make a more efficient collection of available heat. In the fall and spring also, fluid from warm storage area 46 may be valved through house radiator 11, FIGS. 1 and 7, by closing valve 49 and opening valve 50 and leaving open valve 51 thermoprobe 15, FIG. 1 is in this case also wired to fluid circulator 53 in line 30, FIG. 7, which then makes fluid exchange between house coil 11 and warm storage coil 46.

In the same manner house warming auxiliary coil as shown within the exterior wall in cross section as tubes 54 plying between manifolds not shown but operating as a standard manifold coil similar to roof coil 10 is used to warm the exterior walls of said house 32 FIGS. 1 and 6 being valved by hand valves in substitution for interior house warming coil 11 so that hot fluid from coil 12 or warm fluid from coil 46 may be exchanged with the fluid in exterior wall coil 54 either on a continuous basis or as called for by a thermoprobe in the same manner as used in coil 11. Thus when heat from coil 54 is transferred to ground coil 46 to cool said wall, said heat is stored in coil storage block 46 in the process. Then when the wall needs to be warmed in the winter this same heat is brought back from coil storage block of earth 46 into coil 54 and warms said wall. Conversely, the same cold is transferred from coil 54 to coil storage 46 and then brought back to cool said wall in the opposite season.

The collector in my present invention collects every ray of the sun which falls on it, winter and summer, from sun-up to sun-down either directly or by reflection into its heat transfer tubes of greatly reduced surface and has no moving or mechanical parts. The focal plane of parallel rays falling on the inside of a semicylindrical reflector is the mid radial plane of that semicylinder regardless of the direction of the parallel rays falling on the inside of said semicylinder. For this reason the heat transfer tube of my collector is made as a flattened tube and is made to transverse the semicylindrical reflector in this radial focal plane, thus reducing by one half the total surface area of said tube while at the same time receiving every ray of the sun falling on the roof of the solar collector.

At night, in the winter, when my collector is collecting cold to be stored in a large block of undisturbed earth it does so by dissipating heat from this block of earth which comes up and out through this flattened collector tube which now has become a heat dissipator tube or radiator tube in the roof, radiating heat directly to the atmosphere above and also indirectly by radiating it toward the semicylindrical heat reflector which in turn reflects all that heat to the atmosphere because of its shape. Double reflective surfaces are thus obtained by having both sides of the flattened tube exposed to the atmosphere for dissipating conducted heat and exposed to the semicylindrical reflector on each side of it for dissipating the radiant heat by reflection.

Thus it is seen that by using a flattened fluid bearing tube that completely or substantially encloses the bisecting radial plane of the semicylindrical reflector in a solar collector, substantial improvements in efficiency are achieved. First, a low volume-high direct contact, ratio is established between the volume of the fluid in the tube and the surface of the tube. This provides quick direct heating of the fluid overcoming natural insulation properties of the fluid as disposed in a round tube. It also overcomes the high reradiation losses of heat inherent in a fin type collector tube. It also has the tremendous advantage of intercepting every ray of the sun's heat falling on the collector from morning till nite and of giving total radiation at nite in the cooling process.

The heat and cold from this highly efficient collector is then alternately transferred into highly efficient and now adequate storage means. In order to provide adequate heat and cold storage in the earth a large volume of the right condition of the earth is necessary. By the method of boring inexpensive holes into the earth (in actual practice 40 feet are bored in 4 minutes), in checker board fashion, and inserting therein U-return tubes which are connected on opposite ends to manifolds, large storage blocks of readily conductive undisturbed earth are provided. The larger the block thus constructed the less is the loss of heat or cold by conduction to outer areas. Thus a point in size is reached where the economical complete heating or cooling of a structure is made possible entirely from natural sources without the necessity of increasing their intensity or without the necessity of using auxiliary means.

Since the perimeter heat losses through the surface on all sides of a storage block, or of a structure, is directly proportional to the temperature of the block or structure on the one hand and of ambient areas on the other my design and invention of zoning the block and the structure as to temperature gradient greatly reduces these perimeter heat losses. Also these individual temperature storage zone gradations provide storage zones for the temperatures of heat and cold of a lower magnitude not possible to store in a central block of intensive heat or cold. Also these perimeter zones recover conducted perimeter losses of heat or cold from the central block.

These moderate temperatures of heat and cold are then used to modify the temperature of the structure during periods of low requirements and for zoned conditioning. Also temperatures ambient to the collector and structure coils provide moderate heat and cold for transfer and storage in these perimeter zones.

These improvements improve and increase the efficiency of heating and cooling by natural means over former constructions manyfold.

I claim:
1. A structure heating and cooling system comprising a building at least part of which is exposed above the ground, said exposed portion having at least two walls and a roof, a first heat exchange means, said means being mounted on said roof and constructed in such a manner as to heat a fluid passing therethrough, a heat storage area located beneath the ground juxtaposed to said structure, a second heat exchange means constructed within said heat storage area, a warm storage area located about the vertical perimeter of said heat storage area, a third heat exchange means constructed within said warm storage area, a cold storage area located beneath the ground juxtaposed to said structure, a fourth heat exchange means constructed within said cold storage area, a cool storage area located about the vertical perimeter of said cold storage area, a fifth heat exchange means constructed within said cool storage area, sixth heat exchange means located within said structure, first fluid transfer means selectively connecting said first heat exchange means to second, third, fourth and fifth heat exchange means whereby heat and cold may be selectively collected by said first exchange means and selectively stored within one of the storage areas, second fluid transfer means selectively connecting said sixth heat exchange means to said second, third, fourth and fifth heat exchange means whereby heat and cold may be selectively removed from said storage areas and used to condition said structure.

2. The system of claim 1 in which auxiliary coils are provided within said walls, a third fluid transfer means selectively connecting said coils to said third and fifth heat exchange means whereby said walls may be selectively warmed and cooled.

References Cited by the Examiner

UNITED STATES PATENTS

| | | | |
|---|---|---|---|
| 231,058 | 8/1880 | Latham et al. | 165—45 |
| 588,177 | 8/1897 | Reagan. | |
| 1,683,434 | 9/1928 | Altenkirch | 237—1 |
| 2,396,338 | 3/1946 | Newton | 126—271 X |
| 2,513,373 | 7/1950 | Sporn et al. | 165—45 X |
| 2,584,573 | 2/1952 | Gay | 126—271 |
| 2,693,939 | 11/1954 | Marchant et al. | 165—45 X |
| 2,907,318 | 10/1959 | Awot | 126—271 |
| 3,109,486 | 11/1963 | Hansen | 165—22 |

FOREIGN PATENTS

| | | |
|---|---|---|
| 1,243,221 | 8/1960 | France. |

JAMES W. WESTHAVER, *Primary Examiner.*